(12) United States Patent
Schulz et al.

(10) Patent No.: US 9,306,367 B2
(45) Date of Patent: Apr. 5, 2016

(54) DEVICE FOR AMPLIFYING A LASER BEAM

(71) Applicant: Trumpf Lasersystems for Semiconductor Manufacturing GmbH, Ditzingen (DE)

(72) Inventors: Joachim Schulz, Gerlingen (DE); Oliver Mueller, Moelingen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 13/804,266

(22) Filed: Mar. 14, 2013

(65) Prior Publication Data

US 2013/0272327 A1    Oct. 17, 2013

(30) Foreign Application Priority Data

Mar. 30, 2012    (DE) .......................... 10 2012 205 308

(51) Int. Cl.
| | |
|---|---|
| H01S 3/07 | (2006.01) |
| H01S 3/10 | (2006.01) |
| H01S 3/034 | (2006.01) |
| H01S 3/223 | (2006.01) |

(52) U.S. Cl.
CPC ............. *H01S 3/10038* (2013.01); *H01S 3/034* (2013.01); *H01S 3/10015* (2013.01); *H01S 3/2232* (2013.01); *H01S 3/076* (2013.01)

(58) Field of Classification Search
CPC ....... H01S 3/034–3/0346; H01S 3/10–3/1398; H01S 3/0014; H01S 3/10015; H01S 3/10038
USPC ................ 359/337.11–337.13, 341.4–341.44
See application file for complete search history.

(56) References Cited

U.S. PATENT DOCUMENTS

| | | | |
|---|---|---|---|
| 3,575,671 A | | 4/1971 | Dessus et al. |
| 3,900,804 A | | 8/1975 | Davis et al. |
| 4,144,505 A | * | 3/1979 | Angelbeck et al. ........... 372/107 |
| 4,865,436 A | * | 9/1989 | Ahonen et al. ............. 359/224.1 |
| 6,069,905 A | * | 5/2000 | Davis et al. .............. 372/50.124 |
| 6,426,966 B1 | * | 7/2002 | Basting et al. .................. 372/19 |
| 6,603,788 B1 | * | 8/2003 | Vogler et al. ..................... 372/57 |
| 7,822,092 B2 | * | 10/2010 | Ershov et al. .................... 372/55 |

(Continued)

FOREIGN PATENT DOCUMENTS

| | | | |
|---|---|---|---|
| DE | 2456687 A1 | 7/1975 | |
| DE | 10102143 A1 | * 7/2002 | .............. H01S 3/034 |

(Continued)

OTHER PUBLICATIONS

Green et al., "Isolation Between Amplifiers in a TEA CO2-Laser Using Absorbing Gases," Dec. 1979, LRP 152/79, 1-16.*

(Continued)

*Primary Examiner* — Joshua King
(74) *Attorney, Agent, or Firm* — Fish & Richardson P.C.

(57) ABSTRACT

A device for amplifying a laser beam is provided. The device includes at least one amplifier chamber in which a laser-active material is provided, at least one transmitting optical member delimiting the amplifier chamber and being arranged at a tilt angle, α, with respect to a plane oriented perpendicularly with respect to an optical axis of the laser beam, and at least one detection unit. The laser beam is reflected by the transmitting optical member into a back reflected laser beam, and the detection unit is arranged such that it detects the back reflected laser beam.

15 Claims, 9 Drawing Sheets

(56) References Cited

U.S. PATENT DOCUMENTS

| | | |
|---|---|---|
| 2001/0028664 A1 | 10/2001 | Vogler et al. |
| 2001/0053162 A1* | 12/2001 | Shio et al. .................. 372/9 |
| 2002/0105994 A1 | 8/2002 | Partlo et al. |
| 2002/0118721 A1 | 8/2002 | Bittenson |
| 2003/0012245 A1* | 1/2003 | Bor .............................. 372/55 |
| 2003/0016363 A1* | 1/2003 | Sandstrom et al. ......... 356/452 |
| 2004/0184503 A1* | 9/2004 | Bor .............................. 372/55 |
| 2006/0239307 A1* | 10/2006 | Nakao et al. ............. 372/29.011 |
| 2007/0091973 A1* | 4/2007 | Henschke et al. ............ 372/92 |
| 2008/0095209 A1* | 4/2008 | Wakabayashi et al. ......... 372/57 |
| 2010/0078577 A1 | 4/2010 | Moriya et al. |
| 2010/0078580 A1* | 4/2010 | Endo et al. ............... 250/504 R |
| 2010/0117009 A1 | 5/2010 | Moriya et al. |
| 2010/0177009 A1 | 7/2010 | Yeh |

FOREIGN PATENT DOCUMENTS

| | | |
|---|---|---|
| DE | 20318870 U1 | 3/2004 |
| JP | 64020679 | 1/1989 |
| JP | 04119678 | 4/1992 |
| JP | 11224966 | 8/1999 |
| JP | 2002280651 | 9/2002 |
| JP | 2005167082 A | 6/2005 |
| JP | 2009512229 | 3/2009 |
| JP | 2010103104 | 5/2010 |
| JP | 2010135769 | 6/2010 |
| JP | 2010186735 | 8/2010 |
| JP | 2011159901 | 8/2011 |
| WO | 2007047705 A1 | 4/2007 |
| WO | WO2011023765 A1 | 3/2011 |

OTHER PUBLICATIONS

Hewagama et al., "Anomalous Gain in an Isotopically Mixed CO2 Laser and Application to Absolute Wavelength Calibration", IEEE Journal of Quantum Electronics, vol. 27, No. 3, Mar. 1991, pp. 465-470.

* cited by examiner

Fig. 1

DEVICE FOR AMPLIFYING A LASER BEAM

CROSS REFERENCE TO RELATED APPLICATION

Under 35 U.S.C. §119(a), this application claims the benefit of a foreign priority application filed in Germany, serial number 10 2012 205 308.5, filed Mar. 30, 2012, the entire contents of which are hereby incorporated by reference.

TECHNICAL FIELD

The disclosure relates to a device for amplifying a laser beam, in particular, to a device in which the laser beam is analyzed in individual amplifier stages.

BACKGROUND

Laser amplifiers are used to increase the intensity of a laser beam. Devices for amplifying laser beams are known which are formed of multi-stage amplifier systems, in particular. For analyzing the laser beam between each amplifier stage, these devices use additional partially transmitting components, as e.g. partially transmitting mirrors.

But using these partially transmitting mirrors means that additional elements have to be provided. Due to the use of additional elements, construction becomes more costly and additional space may be necessary.

Moreover, due to the partial transmission of the mirrors, it may be difficult to cool down the back of the mirrors.

However, when using a laser beam, it is also possible that beams travel in the reverse direction with respect to the propagating direction of the laser beam. These reverse beams can occur due to "self-lasing" or reflections of a forward-propagating beam upon elements of the laser system or, when exposing a target to the laser beam, due to reflections from this target. In order to analyze these reverse beams using conventional techniques, for example further partially transmitting mirrors may be necessary.

SUMMARY

It is possible to eliminate the above-identified disadvantages and to provide a device for amplifying a laser beam, in particular, to provide a device having a simple construction, wherein the device enables a compact design and wherein the device includes a reduced quantity of elements.

Various aspects of the invention are summarized below.

In general, in one aspect, the invention features a device for amplifying a laser beam, including: at least one amplifier chamber with a laser-active material therein; at least one transmitting optical member delimiting the at least one amplifier chamber and being arranged at a tilt angle, $\alpha$, with respect to a plane oriented perpendicularly with respect to an optical axis of the laser beam; and a detection unit arranged such that it detects a laser beam back reflected at the transmitting optical member.

Embodiments of the device can include one or more of the following features. For example, the laser-active material can be a laser-active gas, such as CO2.

The tilt angle, $\alpha$, can be within a range from 1° to 20°.

The detection unit can be arranged outside the at least one amplifier chamber.

The device can include at least one additional amplifier chamber, or at least one additional chamber, including a gas composition and/or a pressure different from the gas composition and/or the pressure in the amplifier chamber.

The at least one transmitting optical member can delimit (e.g., separate) the at least one amplifier chamber from a directly adjacent amplifier chamber or from an additional chamber.

The device can include at least one deflection mirror arranged to deflect the back reflected laser beam onto the detection unit. One of the deflection mirrors can be arranged in one of the amplifier chambers. One of the deflection mirrors can be arranged in one of the additional chambers. The deflection mirror can be arranged such that it deflects both the back reflected laser beam and the laser beam. The laser beam and the deflected laser beam can lie in a deflection plane and the transmitting optical member can be arranged such that the back reflected laser beam impinges on the deflection mirror outside the deflection plane.

During operation of the device, a second laser beam can go in a direction opposite to the first laser beam, and the second laser beam can be partially reflected by the transmitting optical member and is detected by a further detection unit.

The transmitting optical member can be a diamond window.

At least one of the transmitting optical members can include a first anti-reflection coating on at least a first surface. The transmitting optical member can include a second anti-reflection coating on a second surface, and the first anti-reflection coating and the second ant-reflection coating have different degrees of reflection. The transmitting optical member can include a second anti-reflection coating on a second surface, and the first anti-reflection coating and the second anti-reflection coating can have identical degrees of reflection. The first and/or the second anti-reflection coating can have a remaining degree of reflection in a range from 0.01% to 0.5%.

In certain embodiments, a laser beam is partially back reflected at a transmitting optical member provided for allowing the laser beam to pass. A back reflected beam is directed inside the amplifier chamber to a detection unit. Thereby, the device can be compactly designed and a reduced quantity of elements can be used.

The details of one or more embodiments are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
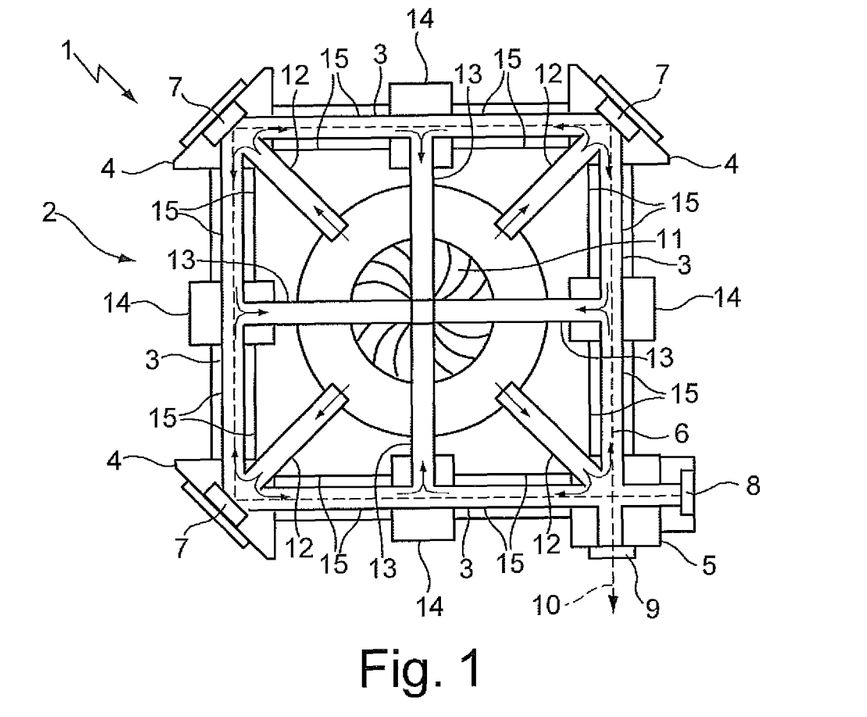
FIG. 1 shows a $CO_2$ gas laser in an embodiment with a laser bent in a quadratic shape.

A $CO_2$ gas laser 1 shown in FIG. 1 includes a laser resonator 2 bent in a quadratic shape having four laser discharge tubes 3 adjoining to each other and connected to each other using corner-type housings 4, 5. A laser beam 6 going in direction of the axes of the laser discharge tubes 3 is illustrated in a dot-dash line. Deflection mirrors 7 in the corner-type housings 4 serve for deflecting the laser beam 6 about 90°, respectively. In the corner-type housing 5, a back mirror 8 and a decoupling mirror 9 partially transmitting the laser wavelength are arranged. The back mirror 8 is formed such that is highly reflective for the laser wavelength and it reflects the laser beam 6 about 180° so that the beam passes through the laser discharge tubes again. A portion of the laser beam 6 is decoupled out of the laser resonator 2 at the partially transmitting decoupling mirror 9, the other reflected portion remains in the laser resonator 2 and it is passed again through the laser discharge tubes 3. The laser beam decoupled out of the laser resonator 2 by the decoupling mirror 9 is denoted with 10. In the center of the bent laser resonator 2, a radial fan 11 connected to the corner-type housings 4, 5 via the supply lines 12 for laser gas is arranged as a pressure source of laser gas. Exhaust lines 13 run between exhaust housings 14 and the radial fan 11. The flow direction of the laser gas inside the laser discharge tubes 3 and in the supply and exhaust lines 12, 13 is illustrated by means of arrows. The excitation of the laser gas is done by electrodes 15 arranged adjacent to the laser discharge tubes 3.

Figure 2:
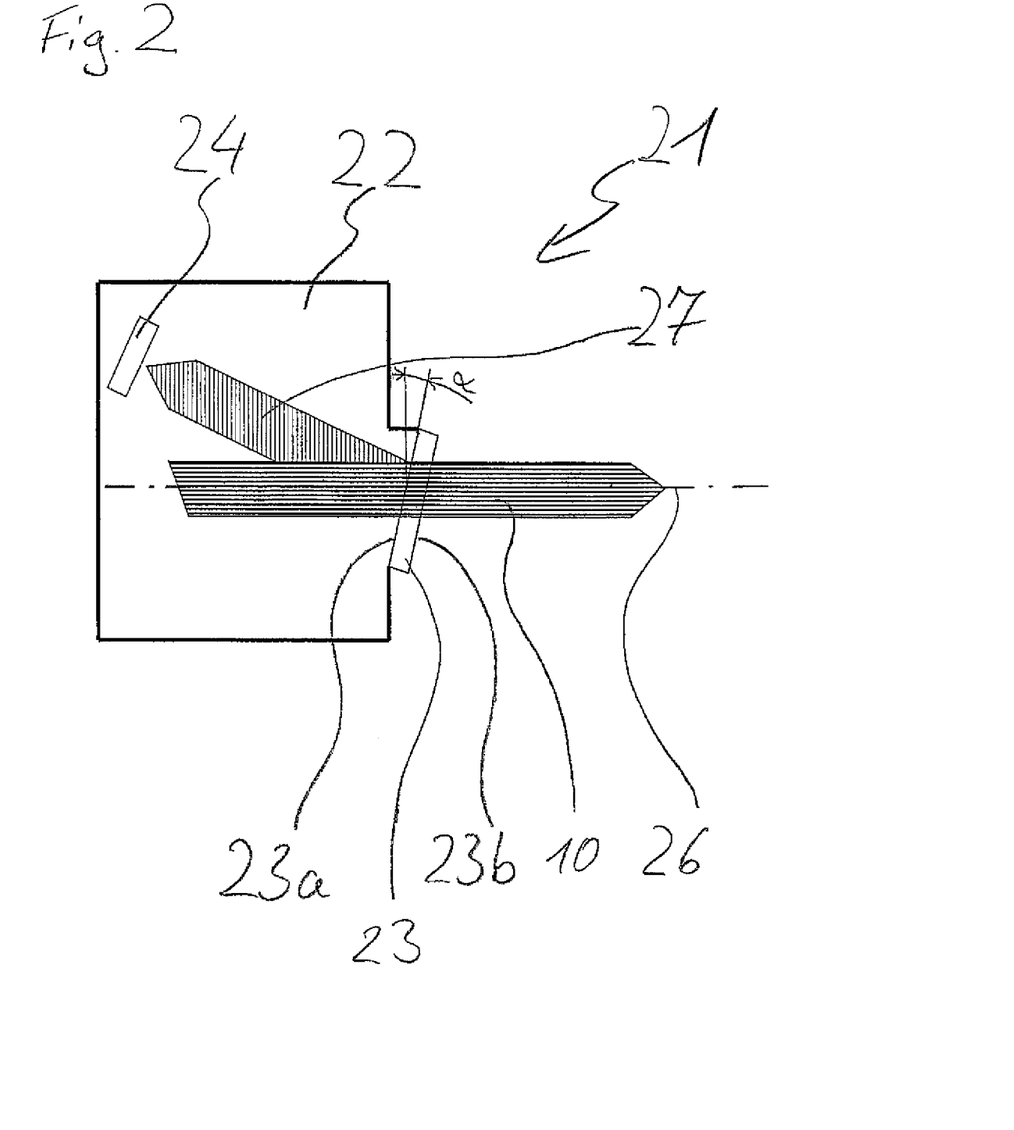
FIG. 2 is an illustration in principle of a first embodiment of a device for amplifying a laser beam, the device having a detection unit inside an amplifier chamber.

FIG. 2 shows an illustration in principle of a first embodiment of a device 21 for amplifying the laser beam 10. The device 21 includes an amplifier chamber 22 in which a laser-active gas is provided. $CO_2$ is provided as laser-active gas. However, also other laser-active gases, as e.g., argon or krypton or also gas mixtures, or a solid-state laser can be provided.

The amplifier chamber 22 is constructed in principle as the laser resonator 2. However, here, the laser beam 10 introduced into chamber 22 is amplified. The laser beam 10 propagates along an optical axis 26. The device 21 for amplifying the laser beam 10 are usually provided with four amplifier stages. According to requirements and technical opportunities, more or less amplifier stages can be deployed. Alternatively, in some embodiments, a laser beam 10 can be generated (rather than simply amplified) in the amplifier chamber 22.

The amplifier chamber 22 includes an end window delimiting (i.e., delineating) the amplifier chamber 22 as a transmitting optical member 23 through which the laser beam 10 exits out of the amplifier chamber 22. An end window (not shown) through which the laser beam 10 enters into the amplifier chamber 22 is provided, too. The transmitting optical member 23 is a diamond window in this embodiment. The transmitting optical member 23 includes a first surface 23a and a second surface 23b. The first surface 23a is facing towards the laser beam 10 and, in this embodiment; it is directed to the inside of the amplifier chamber 22. The second surface 23b is opposite to the first surface 23a.

The transmitting optical member 23 is arranged such that the first surface 23a facing towards the laser beam 10 is arranged non-perpendicular to optical axis 26 and that it has a tilt angle α with respect to a plane being perpendicular with respect to the optical axis 26 of the laser beam. Because the surface 23a is non-perpendicular to optical axis 26, the tilt angle α is different from 0. The inclined position about the tilt angel α causes the laser beam 10 to be partially reflected at the transmitting optical member 23 and a back reflected laser beam 27 to be generated. Except from that, by the inclined position, self-oscillation/self-lasing is prevented. In this embodiment, the angle α is 3°+0.5° but, alternatively, it can be in a range from 1° to 20°. The angel α may sufficiently small so that a polarization of a circular polarized laser beam is not substantially altered and may be sufficiently large to adequately separate back reflected laser beam 27 from the laser beam 10 within a certain distance.

The diamond window is suitable in particular for high pulse power and medium power. In place of the diamond window, alternatively, other suitable end windows can be provided. For example, an end window made of zinc selenide could be used.

The first surface 23a and the second surface 23b are free from coating in this embodiment. However, the first surface 23a and/or the second surface 23b can be coated, e.g., with a partial-reflection coating partially reflecting only a small fractional part of the laser beam 10 or with an antireflection coating. The antireflection coating has a residual degree of reflection of 0.01 to 0.5%. In some embodiments, the first surface 23a and the second surface 23b have either similar or different degrees of reflection. By different degrees of reflection, the contrast from the one side to the other side can be increased. Otherwise, when plane parallel window substrates are used (or wedges with very small wedge angles), severe interference fringe may occur and, in the case of big wedge angles of the windows, two measuring points would to be observed. Moreover, alternatively, different wavelengths can be differently reflected.

The first surface 23a and the second surface 23b are formed in a planar shape. In alternative embodiments, the surfaces 23a, 23b can also be curved such that they only influence the back reflected laser beam 27. If, for example, the curvatures are identical, only the back reflected laser beam 27 is influenced (e.g. focused). However, if the curvatures are different, the laser beam 10 and the back reflected laser beam 27 may be influenced in a different way.

The device 21 shown in FIG. 2 further includes a detection unit 24. the back reflected laser beam 28 is directed to the detection unit 24 by the inclined position of the transmitting optical member 23 with respect to the optical axis 26 of the laser beam and it is analyzed by the detection unit 24.

In certain embodiments, the detection unit 24 analyses the back reflected laser beam 27 partially synchronous by different detectors. For example, an average power and, using fast power meters, pulse power and pulse energy are detected. Using cameras, a mode shape in the near-field and a mode shape in far-field are detected. Using a camera or of a quadrant detector, pointing is determined. A wave shape is detected using a Shack-Hartmann sensor. The detectors of the detection unit 24 need only very low power. Thus, using a beam splitter separating the back reflected laser beam 27 onto different detectors of one or several detection units 24, several analyses can be served at the same time.

The detection unit 24 is arranged inside the amplifier chamber 22 in the embodiment shown in FIG. 2.

Figure 3:
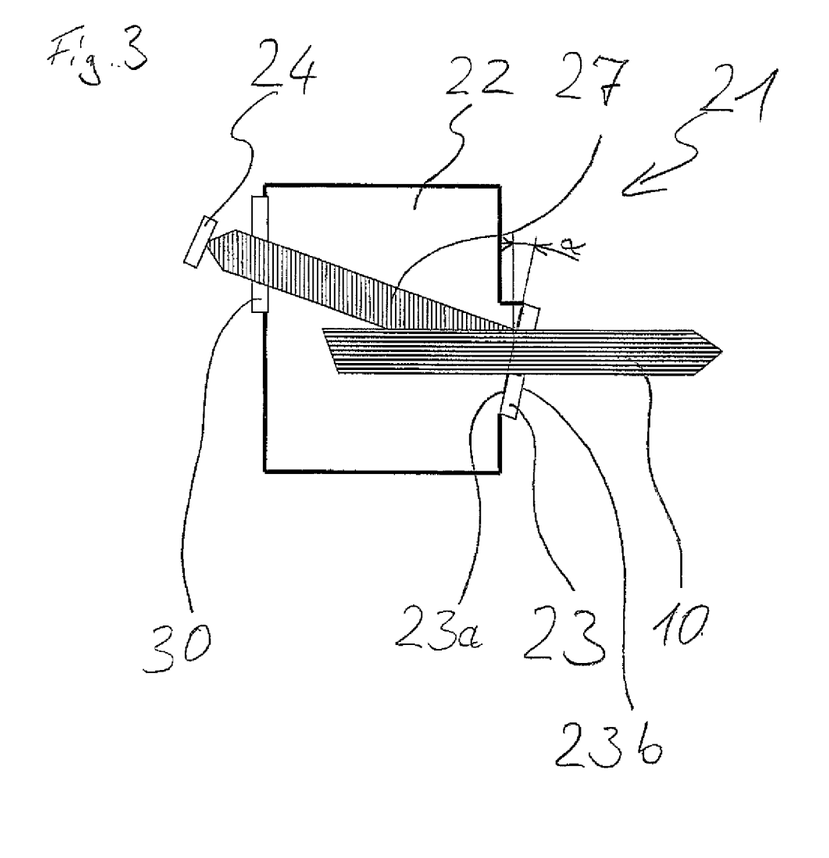
FIG. 3 is an illustration in principle of a second embodiment of the device having the detection unit outside the amplifier chamber.

In FIG. 3, an illustration in principle of a second embodiment is shown. Here, the detection unit 24 is arranged outside the amplifier chamber 22. The back reflected laser beam 27 also generated by the partial reflection of the laser beam 10 at the transmitting optical member 23 in this embodiment escapes through a further window 30 out of the amplifier chamber 22 and it is analyzed by the detection unit 24.

Figure 4:
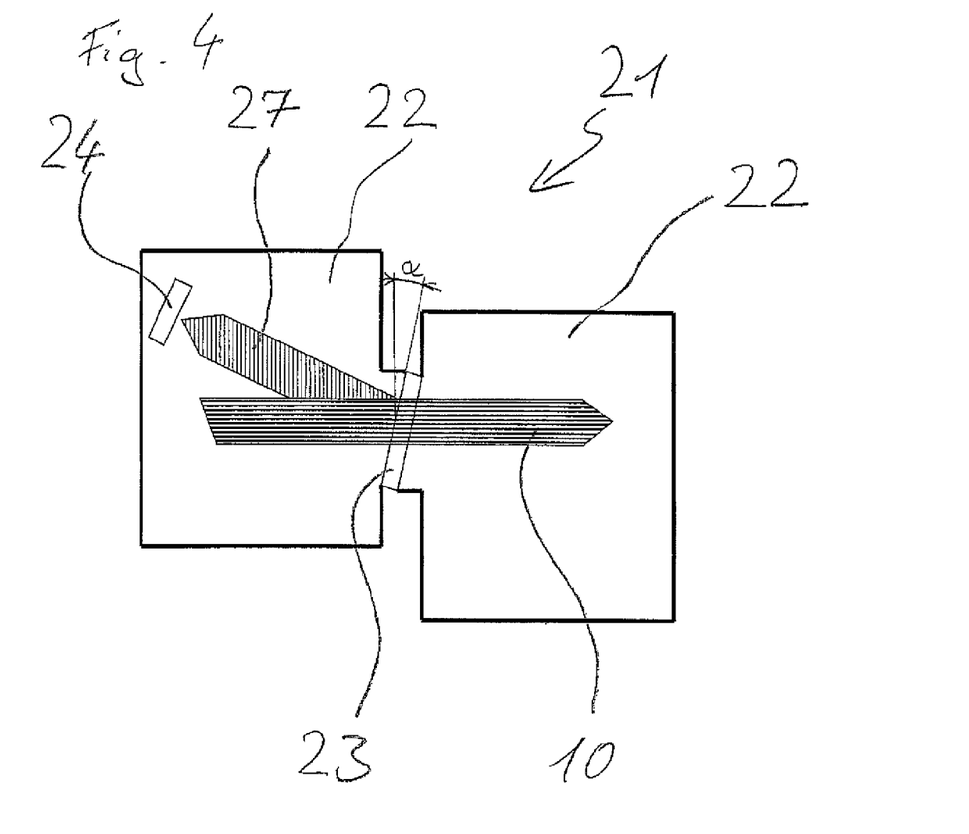
FIG. 4 is an illustration in principle of a third embodiment of the device having two adjacent amplifier chambers.

A third embodiment of the device 21 shown in FIG. 4 shows the amplifier chamber 22 of the first embodiment in which the back reflected laser beam 27 is directed to the detecting unit 24 inside the amplifier chamber 22. Here, a further amplifier chamber 22 is provided adjacent. The two amplifier chambers 22 are arranged such that the transmitting optical member 23 is provided for both amplifier chambers 22 and that it separates them. The laser beam 10 escapes through the transmitting optical member 23 out of the one amplifier chamber 22 and enters into a further amplifier chamber 22.

The further amplifier chamber 22 of the device 21 is also filled with the laser-active gas in this embodiment and, thus, it serves as an additional amplifier stage.

Figure 5:
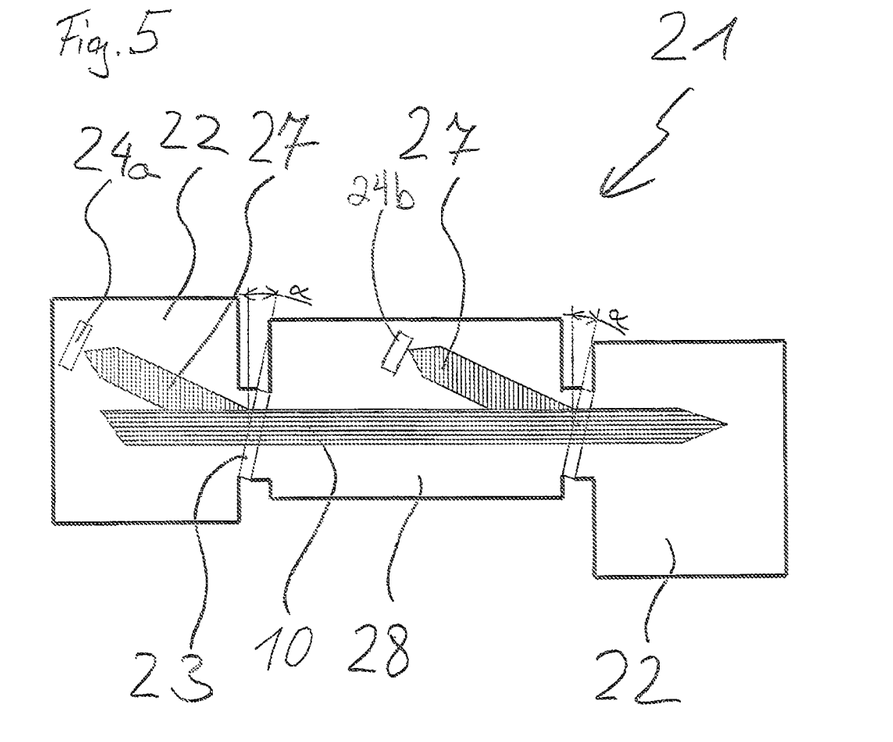
FIG. 5 is an illustration in principle of a fourth embodiment of the device having three adjacent chambers.

As shown in principal in FIG. 5 as a fourth embodiment, the device 21 includes two amplifier chambers 22 and an additional chamber 28. The laser beam 10 already partially reflected by the transmitting optical member 23 in the amplifier chamber 22 illustrated on the left so that the back reflected laser beam 27 is analyzed by the detection unit 24a assigned to this amplifier chamber 22 is also partially reflected by the transmitting optical member 23 between the additional chamber 28 and the amplifier chamber 22 illustrated on the right. As such, in turn, the back reflected laser beam 27 which, in turn, can be analyzed by the assigned detection unit 24b so that alterations in the laser beam 10 can be determined.

The additional chamber 28 is provided with a specific gas composition and/or with a specific gas pressure different from the gas composition or the gas pressure of the amplifier chamber 22. One of the additional chambers 28 can be provided with a scavenging gas, for example, or one of the additional chambers 28 can be provided with vacuum. Then, this chamber 28 either only serves for passing the laser beam 10 or there are active or passive optical members included, as e.g. focusing mirrors, room filters or deflection mirrors. Also here, the laser beam 10 can basically be analyzed. In alternative embodiments, the quantity and the arrangement of the amplifier chambers 22 and of the additional chambers 28 are selected and arranged according to the requirements.

Figure 6:
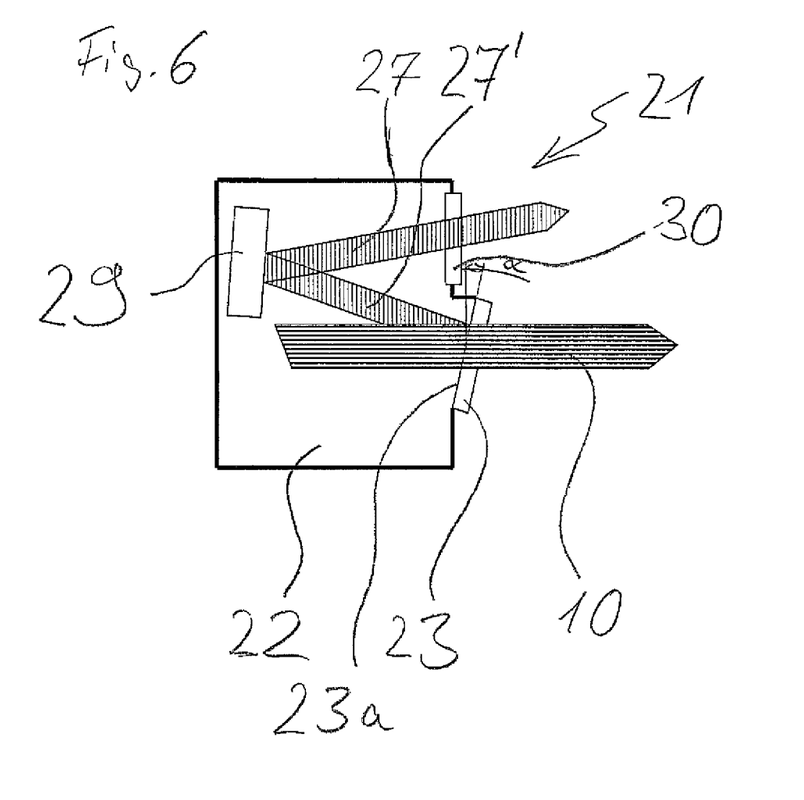
FIG. 6 is an illustration in principle of the device having a deflection mirror in the amplifier chamber.

In FIG. 6, a fifth embodiment of the device 21 is shown. In this embodiment, a deflection mirror 29 is provided inside the amplifier chamber 22. By the deflection mirror 29, the back reflected laser beam 27 is deflected so that a deflected back reflected laser beam 27' is generated, it escapes through the further window 30 out of the amplifier chamber 22 and it is analyzed by the detection unit (here not shown) there.

In certain embodiments, the deflection mirror 29 and the detection unit 24 can be arranged inside or outside of the amplifier chamber 22 or of one of the additional chambers 28, wherein the back reflected laser beams 27 then escape through further windows out of the chambers 22, 28. In some embodiments, the deflection mirror 29 can be arranged outside of one of the chambers 22, 28 and the detection unit can be arranged inside of one of the chambers 22, 28.

Figure 7:
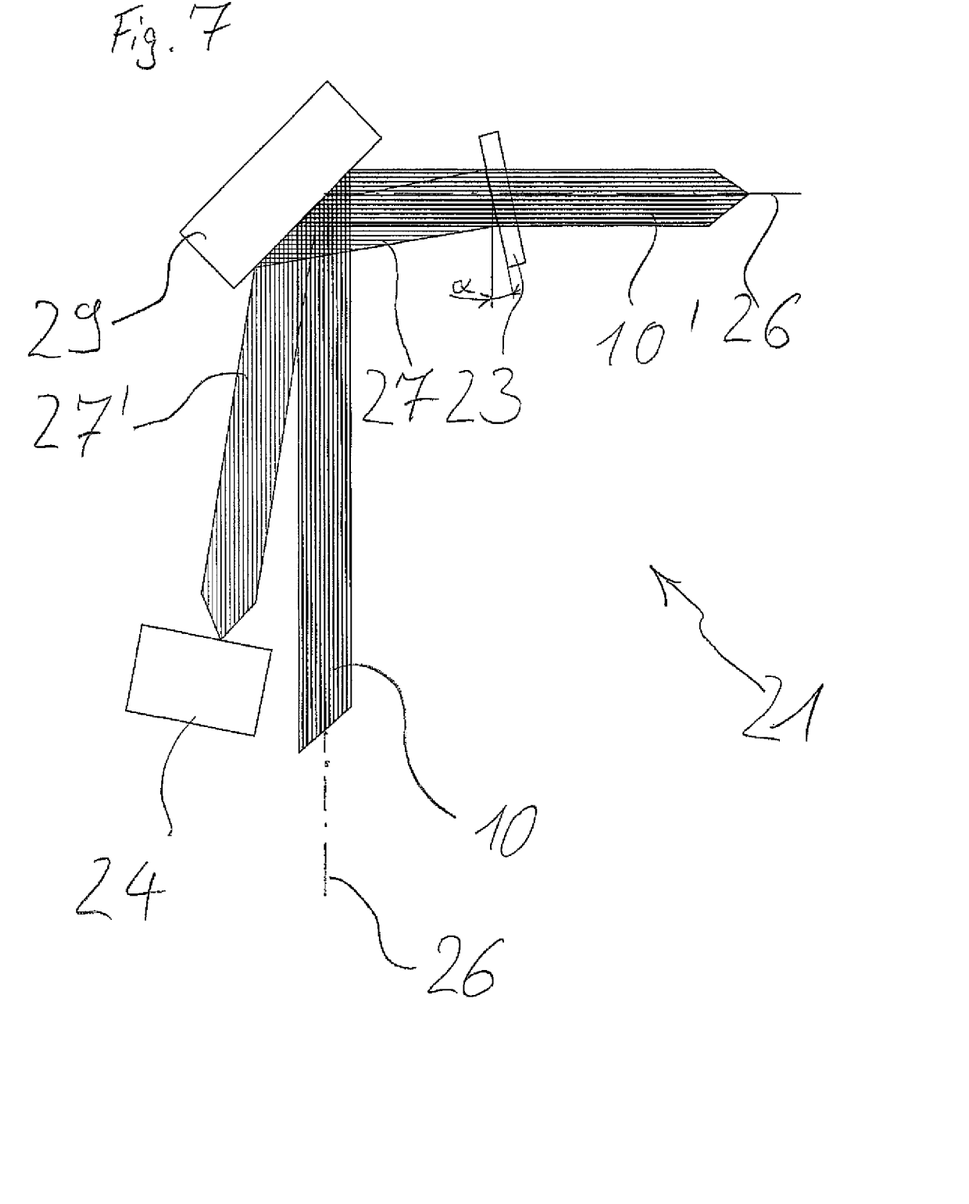
FIG. 7 is an illustration in principle of beam paths in the device in which a deflection mirror is used for the laser beam and for a reflected beam.

FIG. 7 shows an illustration in principle of beam paths in the device 21. In this embodiment, the laser beam 10 is deflected by the deflection mirror 29 so that a deflected laser beam 10' occurs. The deflected laser beam 10' then escapes through the transmitting optical member 23. Thereby, in turn, the back reflected laser beam 27 is generated by partial reflection. The back reflected laser beam 27 is deflected at the deflection mirror 29 at which the laser bream 10 is deflected, too, and a deflected back reflected laser beam 27' is directed to the detection unit 24. This is advantageous, in particular, in the case of small angles a and the corresponding only slow separation of the laser beam 10 and the back reflected laser beam 27. The lager the angle α is, the larger the area of the deflection 29 should be. Hence, small angles α have the advantage that the area of the deflection mirror 29 also can be small.

Figure 8:
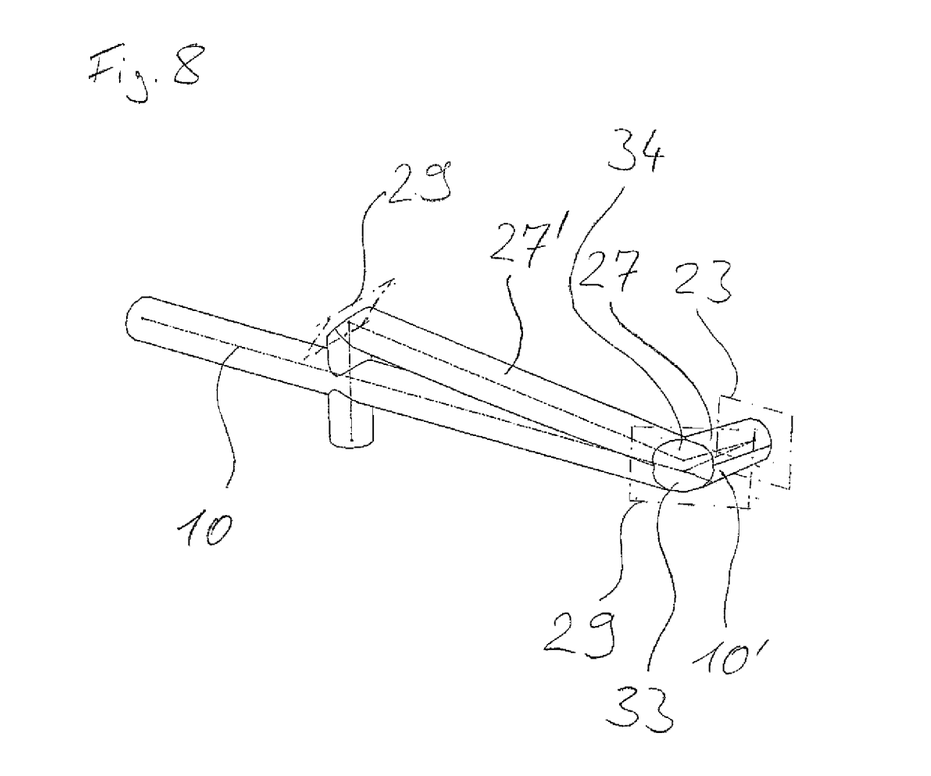
FIG. 8 shows a beam path of a further alternative embodiment of the device having two deflection mirrors.

FIG. 8 shows the pathway of the laser beams in a further embodiment of the device. The deflection mirror 29 and the transmitting optical member 23 are illustrated only in principle in this figure.

Also here, the laser beam 10 is deflected into the deflected laser beam 10' towards the transmitting member 23 by means of the deflection mirror 29. In this embodiment, the transmitting optical member 23 is inclined such that a plane created by the deflected laser beam 10' and the back reflected laser beam 27 is located perpendicular with respect to a deflection plane created by the laser beam 10 and the deflected laser beam 10'. The laser beam 10 is deflected inside an almost elliptical first area 33. The back reflected laser beam 27 is deflected at a second almost elliptical area 34. Because the plane created by the deflected laser beam 10' and the back reflected laser beam 27 is located perpendicular with respect to the deflection plane created by the laser beam 10 and the deflected laser beam 10', the ellipses are located on top of the other along their minor axes. Thus, the back reflected laser beam 27 impinges out of the deflection plane on the deflection mirror 29. By lying on top of each other along the minor axes, the dimension, in this case a diameter, of the deflection mirror 29 only has to be slightly bigger than in the case in which the back reflected laser beam 27 is not deflected via the same deflection mirror 29 as the laser beam 10.

In some embodiments (not shown), the plane created by the deflected laser beam 10' and the back reflected laser beam 27 is in the deflection plane created by the laser beam 10 and the deflected laser beam 10', so the ellipses are located side by side along their major axes. In this case, the dimension of the mirror should be much bigger than in the case of the embodiment described above.

In the embodiment shown in FIG. 8, a circular substrate is sufficient. As smaller the diameter of the deflection mirror 29 is as easer it is to produce and to handle. Also, the deflection mirror 29 and the transmitting optical member 23 can form a constructively compact unit.

Figure 9:
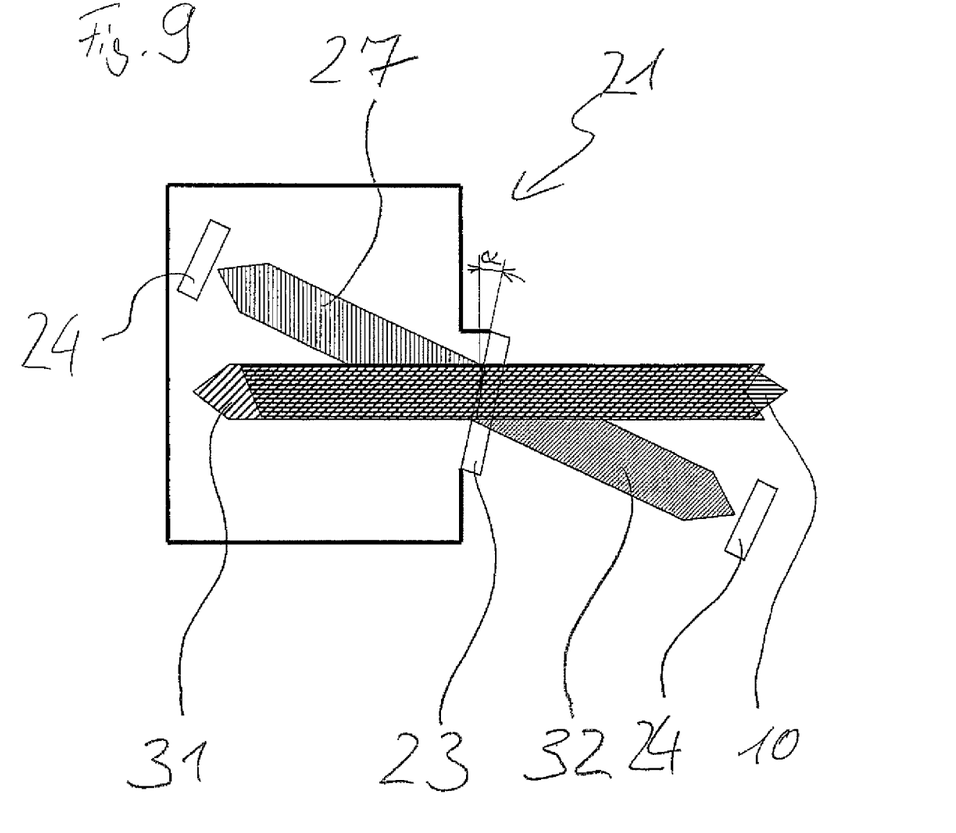
FIG. 9 is an illustration in principle of a further embodiment of the device, wherein forward and reverse laser beams are analyzed.

FIG. 9 is an illustration in principle of a further embodiment of the device 21. When lasers are used, it is possible that, induced by reflections, also an unwanted second reverse laser beam 31 occurs additionally to the desired forward laser beam 10. The reverse laser beam 31 is also partially reflected due to the inclined position of the transmitting optical member 23 so that a second back reflected beam 32 occurs. The second back reflected beam 32 is directed to one of the detection units 24 independent and separate from the detection units 24 for the forward laser beam 10 by the transmitting optical member 23.

Alternatively, the arrangement and the directing of the second back reflected beam 32 for guiding and directing of the back reflected beam 27 can happen analogously with respect to the alternative embodiments.

Other embodiments are in the following claims.

What is claimed is:

1. A device for amplifying a laser beam, comprising:
   an amplifier chamber with a laser-active material therein;
   a transmitting optical member delimiting the amplifier chamber and being arranged at a tilt angle, α, with respect to a plane oriented perpendicularly with respect to an optical axis of the laser beam incident on the transmitting optical member;
   a detection unit arranged such that it detects a laser beam back reflected from the transmitting optical member; and a deflection mirror, wherein the deflection mirror and the transmitting optical member are arranged such that, during operation of the device, the deflection mirror deflects the back reflected laser beam and the laser beam, the laser beam and the deflected laser beam lie within a deflection plane, and the back reflected laser beam impinges on the deflection mirror outside the deflection plane.

2. The device according to claim 1, wherein the laser-active material is a laser-active gas.

3. The device according to claim 2, wherein the laser-active gas is $CO_2$.

4. The device according to claim 1, wherein the tilt angle, $\alpha$, is within a range from 1° to 20°.

5. The device according to claim 1, wherein the detection unit is arranged outside the amplifier chamber.

6. The device according to claim 1, comprising at least one additional chamber comprising a gas composition and/or a pressure different from a gas composition and/or a pressure in the amplifier chamber.

7. The device according to claim 1, wherein the transmitting optical member delimits the amplifier chamber from a directly adjacent amplifier chamber or from an additional chamber.

8. The device according to claim 1, wherein the deflection mirror is arranged in the amplifier chamber.

9. The device according to claim 1, comprising at least one additional chamber, wherein the deflection mirror is arranged in one of the additional chambers.

10. The device according to claim 1, wherein the transmitting optical member is arranged such that during operation of the device, a second laser beam propagating in a direction opposite to the first laser beam is partially reflected by the transmitting optical member and is detected by a further detection unit.

11. The device according to claim 1, wherein the transmitting optical member is a diamond window.

12. The device according to claim 1, wherein the transmitting optical member comprises a first anti-reflection coating on a first surface.

13. The device according to claim 12, wherein the transmitting optical member comprises a second anti-reflection coating on a second surface, and the first anti-reflection coating and the second anti-reflection coating have different degrees of reflection.

14. The device according to claim 12, wherein the transmitting optical member comprises a second anti-reflection coating on a second surface, and the first anti-reflection coating and the second anti-reflection coating have identical degrees of reflection.

15. The device according to claim 12, wherein the transmitting optical member comprises a second anti-reflection coating on a second surface, and wherein the first and/or the second anti-reflection coating has a remaining degree of reflection in a range from 0.01% to 0.5%.

* * * * *